INVENTOR.
MARTIN H. SIMON
BY
AGENT

June 14, 1966 M. H. SIMON 3,255,958
CENTRIFUGAL DESLUDGING SEPARATOR
Filed Dec. 4, 1962 3 Sheets-Sheet 3
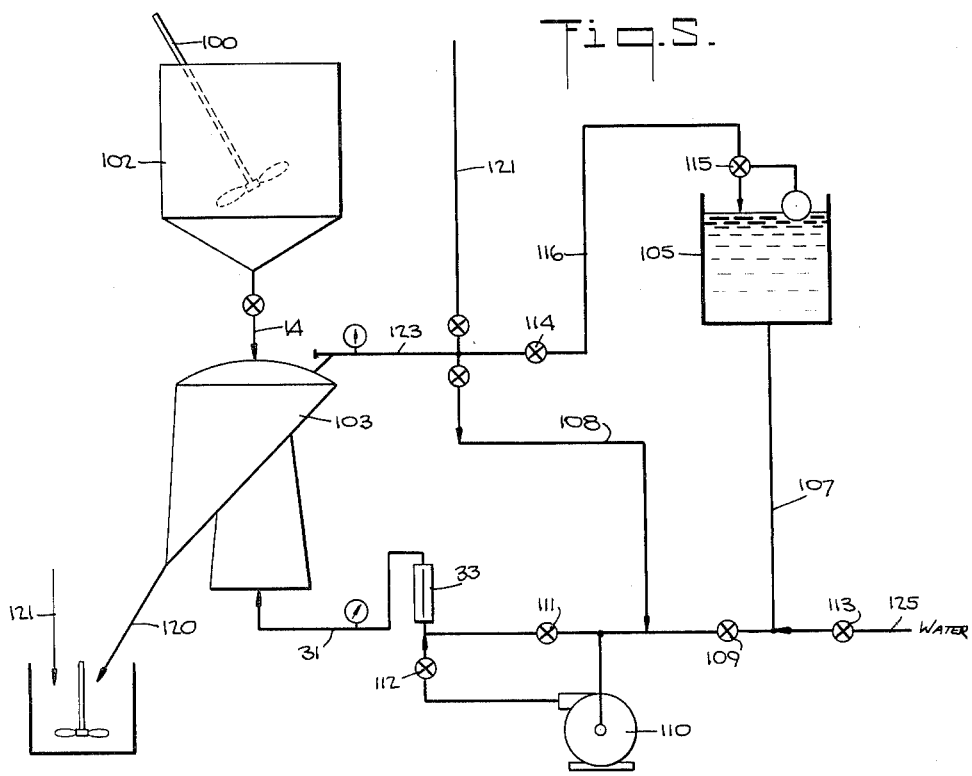
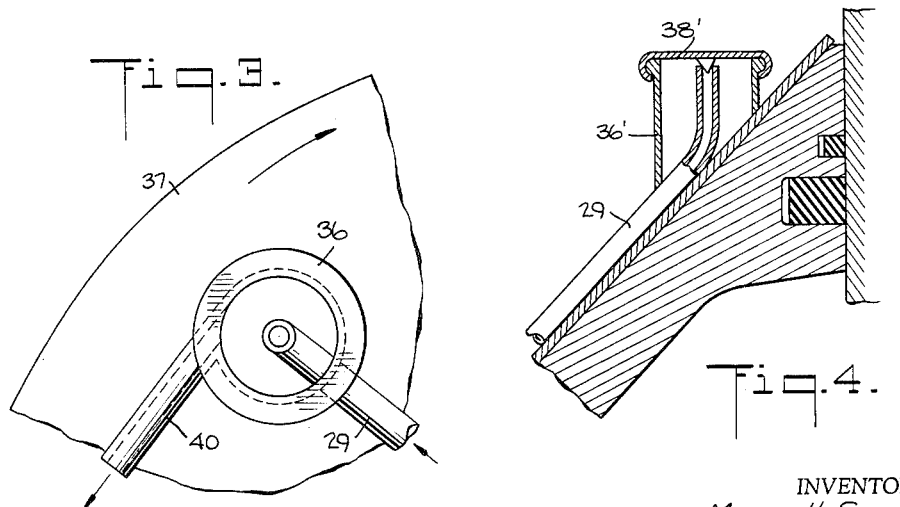
INVENTOR.
MARTIN H. SIMON
BY
AGENT

United States Patent Office 3,255,958
Patented June 14, 1966

3,255,958
CENTRIFUGAL DESLUDGING SEPARATOR
Martin H. Simon, Bergenfield, N.J., assignor to Westfalia Separator A.G., Oelde, Westphalia, Germany, a company of Germany
Filed Dec. 4, 1962, Ser. No. 242,297
12 Claims. (Cl. 233—20)

The present invention relates to centrifugal separators and more particularly to the type of automatic self-cleaning bowl de-sludgers or separators wherein sludge accumulating inside the bowl is periodically discharged from the sludge space in the bowl while the unit continues to run at full speed.

If used to clarify liquids, i.e. to remove solid components therefrom, the heavy phase will consist of solids. When used to separate liquid mixtures containing a light and a heavy component, the heavy phase will be made up of the heavy liquid component which will be thrown into the sludge space by centrifugal force while the light liquid component will flow to the central portion of the bowl whence it is removed.

The de-sludging cycle may be manually controlled. It has also been proposed to provide automatic timing units for actuating solenoid valves forming part of control means for setting the sludge discharge periods. The centrifuging time periods between the intermittent de-sludging periods may be readily determined by examining the solids content of the slurry or liquid mixture fed to the separator and relating the solids content to the throughput of the separator bowl and the sludge space volume of the bowl. Time switches controlled, for instance, by rotating cam means and the like may then be used to energize a control circuit connected to solenoid valves designed to enable the opening and closing of ports for the intermittent discharge of the sludge from the bowl.

When the switches are used for the control of the de-sludging cycle, the de-sludging cycle frequency is pre-set, regardless of the amount of sludge in the bowl at any given time during the centrifuging operation. However, a trouble-free operation of the separator bowl can be had only if the sludge discharge ports are opened at the exact time when the sludge space of the bowl is just filled with sludge. If the ports are opened before that time, a lot of useful liquid is lost with the discharged solids and the operation is, therefore, wasteful. If the ports are opened after the sludge space has been filled with sludge, solids will build up into the channels of the separator disc set in the center of the bowl and thus impair the clarification of the liquid.

Therefore, timing units for the control of the de-sludging cycle presuppose first of all that the solids content of the slurry or liquid mixture to be centrifuged has been exactly calculated and set. Furthermore, they also assume that the throughput of the separator bowl and the solids content of the slurry or liquid mixture remain unchanged during the entire operation of the separator.

In practice, however, the separator receives its charge in many plants from large storage tanks. As the liquid is fed from the tank to the separator, the liquid level in the tank will be constantly lowered, causing a concomitant decrease in the static pressure and a lessening of the throughput. On the other hand, gravity will cause the solids to settle near the bottom of the tank so that the solids content of the charge entering the separator will also change during the operation. With these changes in the assumed constants, which have become variables, timing units lose their accuracy.

It has also been proposed to connect the sludge space outside the disc set with a hydraulic cylinder chamber, in which a sliding piston moves to close the sludge discharge port means of the bowl, by means of a small tube so that clarified liquid flows from the sludge space to the chamber and thus keeps the piston in its port closing position. When, however, sufficient sludge is formed to prevent further liquid from entering the tube, a small port in the chamber permits fluid to escape therefrom and the sliding piston moves to open the port means for the sludge discharge from the bowl. As sludge is removed, the inlet of the tube becomes free again to receive clarified liquid, the hydraulic cylinder chamber is filled, and the piston again closes the discharge port means in the bowl. Such a separator bowl accordingly operates constantly in a labile or unstable condition.

In another known apparatus of this type, a small tube conducts clarified liquid from the space outside the disc set to a storage vessel which has an opening in its bottom and which rests on a scale. Before the sludge space is filled with sludge, a uniform amount of liquid flows through the tube into the vessel and an equal amount of liquid flows out of the vessel through its bottom opening. A counterweight of the same weight as the filled vessel keeps the scale in balance. As soon as solids begin to clog the tube and prevent liquid flow therethrough, the arm of the scale carrying the counterweight pivots downwardly and closes a switch which actuates the sludge discharge port means of the bowl. However, in such an arrangement, the counterweight or the vessel must be changed with different specific weights of different slurries fed to the centrifuge. Also, depending on the sensitivity of the scale, even the smallest changes in the liquid flow may cause opening of the bowl.

It is the primary object of the present invention to overcome all these disadvantages of the prior art and to provide an automatic, self-cleaning de-sludger or separator bowl whose de-sludging cycle is controlled sensitively by the pressure of the sludge in the sludge space.

Generally, the present invention relates to centrifugal separators with periodical discharge of accumulated sludge through normally closed ports in the wall of the bowl. The de-sludging cycle is determined by the intermittent opening of the ports by an axially movable piston. Such separator or de-sludging bowls comprise a rotatable bowl and conical disc means mounted concentrically about the bowl axis and having an outer edge spaced from the bowl periphery. The outer edge of the disc means and the bowl periphery define a sludge space. A stationary feed means, such as a pipe, is arranged coaxially in the bowl to feed a slurry to be clarified or a liquid mixture to be separated to the conical disc means. The centrifugal force generated during rotation of the bowl causes the heavy component, i.e. the solids of the slurry or the heavier component of the liquid mixture, to be thrown outwardly of the disc means and to accumulate in the sludge space. A sludge discharge port means is provided in the bowl periphery adjacent the sludge space for intermittently discharging the sludge from the bowl. Control means is provided for actuating the means, i.e. the axially movable piston, for intermittently opening the sludge discharge port means.

In accordance with the present invention, it is proposed to arrange in such a centrifugal separator a conduit means for introducing a detecting liquid into the sludge space, said conduit means having an outlet in the sludge space, a means for gaging the pressure or throughput of the detecting liquid in the conduit means, and means operatively connecting the gaging means with the control means for actuating the control means upon gaging of a predetermined pressure or throughput in the conduit means.

Thus, as the sludge increases in the sludge space, it will increase its pressure upon the conduit means outlet, increasing the pressure and reducing the throughput of the detecting liquid in the conduit means. If a flowmeter or pressure gage is placed in the conduit means to read the throughput or pressure, the setting of this gaging means at a predetermined point may be used to control the opening of the sludge discharge port means and thus to determine the de-sludging cycle most accurately. In addition, the actuating point on the gaging means may be re-set at will to fit different operating conditions.

In a preferred embodiment, the conduit means for the detecting liquid passes through the supporting shaft of the bowl whence a pipe extends radially and along the bottom of the bowl below the disc means and into the sludge space. In place of a pipe, there may be provided a bore or channel in the bowl parts adjacent to the separating space of the bowl. Conveniently, a portion of the light or clarified component discharged from the rotating bowl may be recycled into the conduit means to serve as detecting liquid. In this case, it will simply mix with the light component in the bowl and be discharged again at the top of the bowl.

It is also possible to use water or any other suitable liquid which is heavier than the light component of the mixture or than the liquid part of the slurry to be clarified. In this case, this heavier detecting liquid will mix with the sludge and will be discharged therewith through the peripheral port means.

In another embodiment of this invention, which is especially suitable for solid sludge removal, a pressure-sensitive diaphragm is mounted over the conduit means outlet.

With the arrangement according to this invention the de-sludging cycle may be accurately controlled not only when solids are removed from liquids to clarify the same but also when liquid mixtures are separated into their heavy and light components since the pressure of solids as well as heavy liquids is gaged in the sludge space. Furthermore, the flowmeter or pressure gage in the detecting liquid line outside the bowl can be checked at any time during operation of the bowl so that de-sludging may be effected at any desired point, even when the sludge space is only partially filled. This is in contrast to known control arrangements which operate either at a given time interval or when the sludge space is filled to a specific predetermined level. By adjusting the electrical contact on the flowmeter, for instance, de-sludging may be effected at any desired point of pressure in the sludge space.

If the effluent or clarified liquid is used as detecting liquid, none of it is wasted since the centrifugal force within the bowl will force the detecting liquid discharged into the sludge space to return to the disc set and thus to be recycled to the output means of the bowl.

The above and other objects, advantages, and features of the present invention will become more apparent when the same is considered in the following detailed description of certain specific embodiments thereof, taken in conjunction with the accompanying drawing wherein FIG. 1 is a vertical section showing a generally conventional centrifugal separator bowl incorporating one embodiment of this invention;

FIG. 3 is a top view of the pressure-sensitive means of FIG. 2;

FIG. 4 is a sectional view similar to FIG. 2 but showing another modification of the pressure-sensitive means; and FIG. 5 is a diagram showing the operation of the centrifugal separator bowl.

Like reference numerals indicate like parts in all figures of the drawing.

Figure 1:
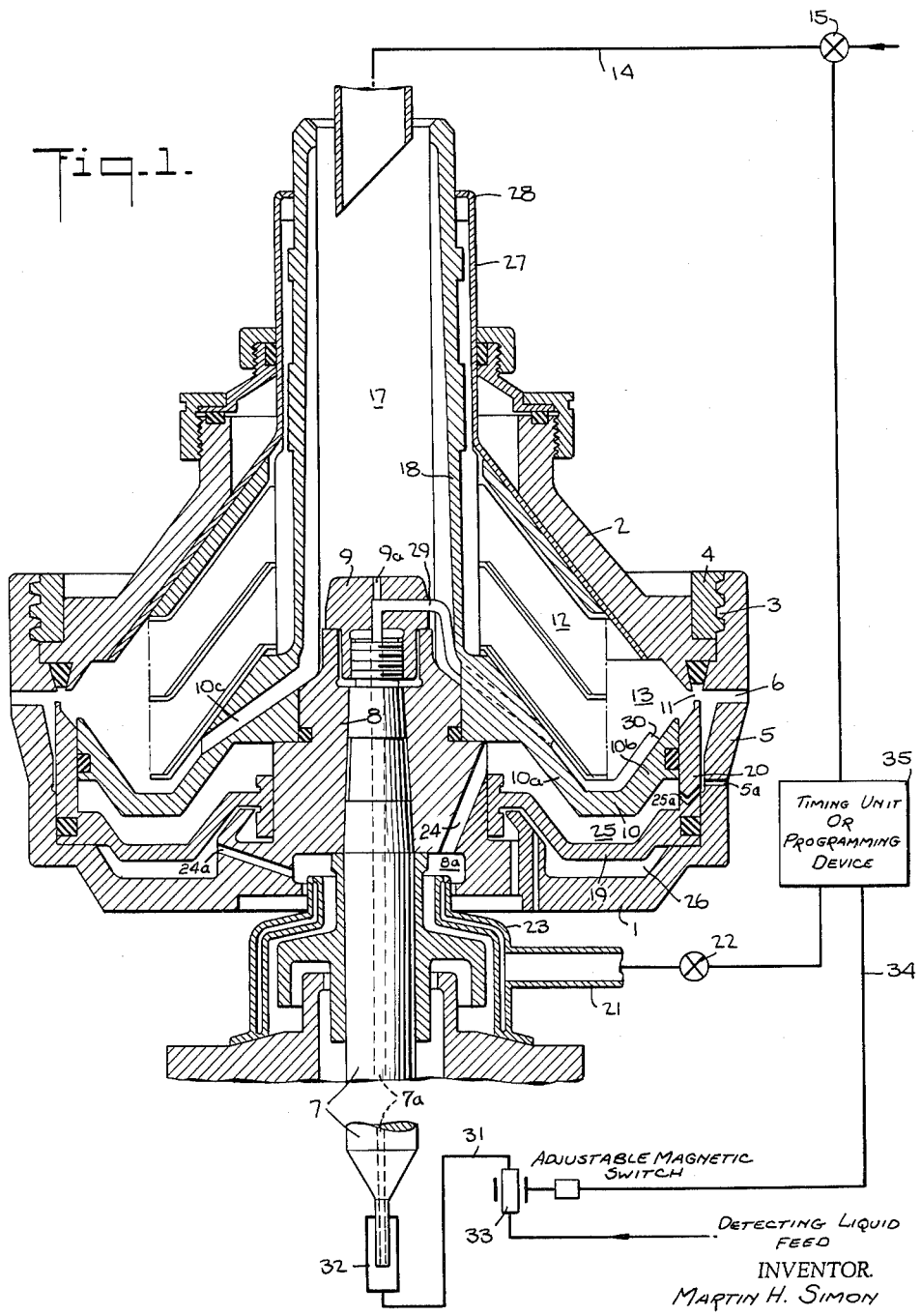

Referring first to FIG. 1, there is shown a centrifugal separator bowl used as a clarifier but the basic design of this unit is such that it may readily be converted into a separator for liquid mixture components of different specific gravity. The simple exchange of a few parts adapts such bowls for separation and purification, extraction and clarification.

The unit comprises a bowl with a bottom wall 1 and a conical upper wall 2. The peripheral cylindrical portion of the bottom wall 1 carries a thread 3. The bottom part 1 and the upper part 2 are held together by a threaded ring 4, which engages into thread 3. At the upper part of skirt 5 there are provided several slots 6, equally spaced circumferentially.

The bowl is mounted for rotation on hollow shaft 7 whereon the bottom wall 1 is keyed by means of hub 8, the hub being held on the shaft by cap 9 which threadedly and fluid-tightly engages the shaft and the hub. A separating wall 10 extends radially from the hub toward the peripheral portion of the bowl and has a first wall portion 10 generally parallel to the conical upper wall 2 of the bowl and a second wall portion 10b extending upwardly from the end of the first separating wall portion toward the conical upper wall and defining an opening 11 therewith. The slots 6 in connection with the annular opening 11 constitute sludge discharge port means in the periphery of the bowl.

Conical disc means constituted by a disc set 12 is mounted coaxially in the interior of the bowl between the conical upper wall 2 and the conical separating wall portion 10a. A sludge space 13 is defined by the upper wall 2 and the upwardly extending separating wall portion 10b, the sludge space being laterally bounded by the outer edge of the disc set and the annular opening 11.

The liquid to be clarified or the liquid mixture to be separated is fed to the bowl from a supply (not shown) through a feed line 14, the feed flow being controlled by valve 15 in the feed line. The feed line empties into a feed pipe 16 leading into an axially extending feed chamber 17 defined by a conical tube 18 extending upwardly from the separating wall 10, a feed channel 10c leading from the feed chamber toward the bottom of the disc set.

The sludge discharge port means is illustrated in the open or discharge position in FIG. 1. It may be closed by an axially slidable, pressure fluid operated, annular piston 19 mounted for sliding movement on hub 8 between the bottom wall 1 of the bowl and separating wall 10. An annular skirt 20 extends upwardly from the piston between the peripheral wall of the bowl and the upwardly extending separating wall portion toward opening 11. The piston skirt forms a fluid-tight joint with the adjacent walls so that pressure fluid supplied to either of the chambers on opposite sides of the piston will move the same either upwardly or downwardly, upward motion of the piston moving the piston skirt over opening 11 and thus closing the sludge discharge port means.

The pressure fluid for operating the piston may be water, for instance, and is supplied through pipe 21 when the valve 22 is opened. The operating water then flows from pipe 21 into and through conduit 23 and into annular compartment 8a, whence it passes through bore 24 in hub 8 into the chamber 25. When it is desired to close the port means again, pressure in chamber 25 is relieved, the fluid therein being vented through angled bore 25a in piston 19 and cooperating radial bore 5a in skirt 5, and pressure fluid is supplied to the lower chamber 26 by suitable means (not shown) through bore 24a from compartment 8a. The operation of this port closing piston is well known per se and forms no part of the present invention, except insofar as combined with the control means to be described hereinafter. Useful means for the piston operation is described, for instance, in the Bulletins regarding the automatic desluger centrifuges of the firm Westfalia Separator A.G. of Oelde, Westphalia, Germany, such as Bulletin No. 2634 regarding "Westfalia Sanitary Automatic De-Sludgers SAMN–5036," and others.

Upon rotation of the bowl on shaft 7, which is connected to a suitable power source (not shown), the heavier component of the liquid fed into the bowl is thrown outwardly by centrifugal force and accumulates in sludge space 13 between the outer edge of the disc set 12 and the periphery of the bowl. The lighter liquid component rises in the channels between the conical discs and passes upwardly through an annular space defined between the conical tube 18 and a shell 27 which has an outlet 28 on top whence the effluent is discharged. If desired, centripetal pump means may be provided for the discharge of the lighter component and it will be obvious to the skilled in the art that various other details of the described separator bowl may be changed, all of the heretofore described structure being conventional and merely constituting one form of a self-cleaning de-sludger or separator to which the present invention may be applied.

According to the invention, a detecting liquid is fed into the sludge space 13 for constant determination of the pressure therein. For this purpose, liquid conduit means is arranged to lead into the sludge space, the illustrated conduit means consisting of a pipe 29 leading through the feed channel into the sludge space, ending therein in conduit means outlet 30. In case the detecting liquid contains gases it is of advantage to deaerate the detecting system at its highest point by a calibrated bore or similar means 9a. A detecting liquid is supplied to the pipe or shaft 7 through a supply line 31 leading into a stuffing box 32 connecting the supply line to the axial bore 7a in shaft 7.

Means is mounted in the supply line for metering the detecting liquid flowing through the conduit means. The metering means 33 may be a flowmeter or a pressure gage and will indicate the throughput or pressure of the detecting liquid. Obviously, the more sludge, i.e. solids or heavy liquid component, there is in the sludge space, the greater will be the pressure against the outlet 30. This back-pressure or impedance to flow of the detecting liquid will be read by the metering means and the same will be set so as to actuate an electrical control circuit 34 leading to a conventional timing unit or programming device 35 controlling the solenoid valves 15 and 22. In this manner, the liquid feed to the bowl and the de-sludging thereof are most accurately and readily adjustably controlled by the accumulation of sludge within the sludge space.

Figure 2:
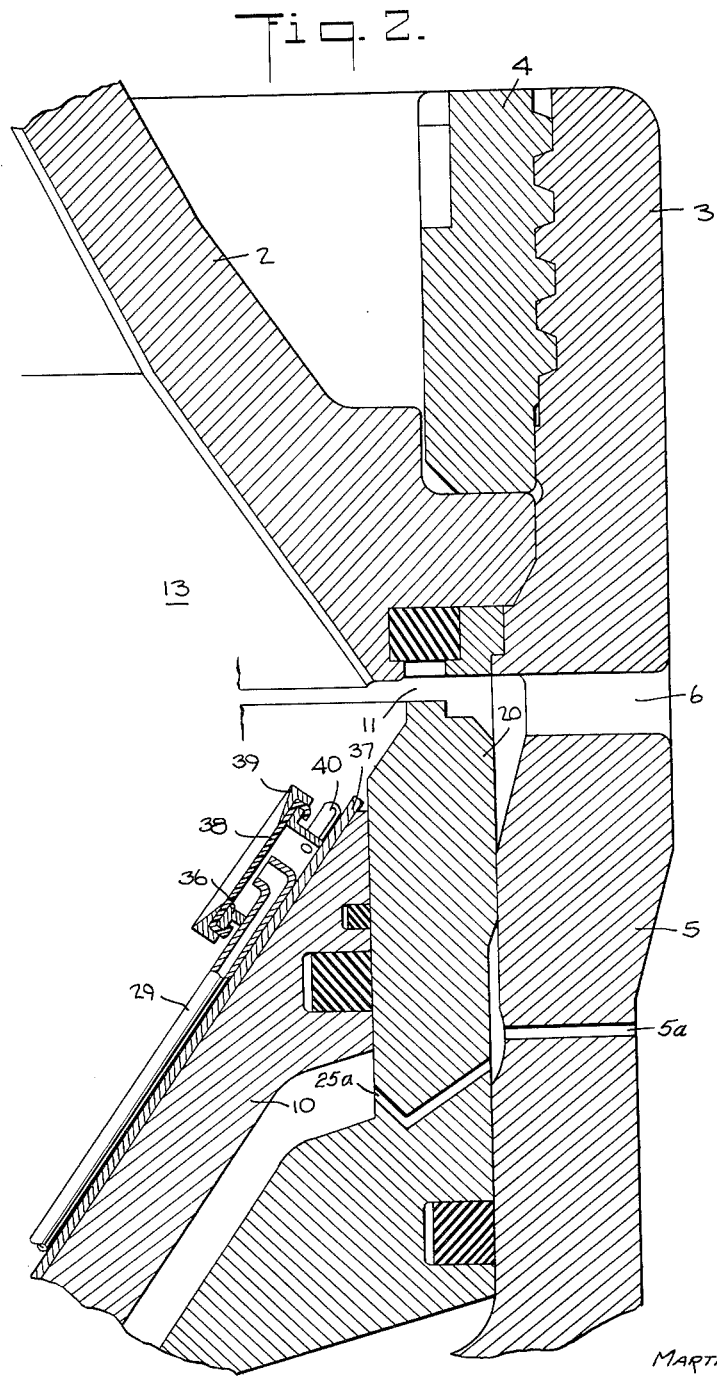
FIG. 2 is an enlarged vertical section of a portion of the bowl of FIG. 1 showing a modified pressure-sensitive means in the sludge space.

FIGS. 2 and 3 illustrate a preferred embodiment of the outlet of the detecting liquid conduit means 29 which is particularly useful if the sludge consists of solids. As shown therein, the outlet end of pipe 29 is bent upwardly toward the axis of the bowl and is surrounded by a pressure box. The pressure box consists of a cylindrical housing 36 mounted on wear liner 37 of the separating wall 10. A pressure-sensitive metal or plastic diaphragm 38 is arranged over the open end of the cylindrical pressure box housing and held thereon by ring 39. A peripherally extending discharge pipe 40 leads from the pressure box into the sludge space 13 with its outlet arranged far enough away from the diaphragm so that the discharged detecting liquid does not dislodge the sludge exerting its pressure on diaphragm 38 to regulate the pressure and throughput of detecting liquid.

In the modification of FIG. 4, the outlet of the detecting liquid conduit means 29 extends parallel to the rotational axis of the bowl, being surrounded by a similarly extending cylindrical pressure box 36' closed off by a suitable metal diaphragm 38', such as of stainless steel, which extends perpendicularly to the rotational axis.

A polyethylene membrane is particularly useful when water is used as the detecting liquid because polyethylene floats in water and, therefore, is pressed by the water emerging from the outlet 30 away from the outlet opening, thus assuring trouble-free operation. If a metal diaphragm is used, it must be perpendicular to the rotational axis of the bowl, i.e. it must extend generally in the direction of the centrifugal force so that its movement in relation to the outlet is not influenced by this force.

The detecting liquid is fed into the sludge space through the conduit means 29, 30 under a slight overpressure to overcome the pressure head in the bowl before sludge has accumulated therein. With increasing amount of sludge or heavy phase liquid the pressure head in the bowl increases and consequently reduces the flow of the detecting liquid.

A useful installation for operation of a centrifugal separator bowl constructed according to the present invention is illustrated in FIG. 5. This installation may be adapted for use of the bowl as a clarifier, wherein solid sludge is separated from a liquid or wherein small amounts of a heavy liquid are separated from a light liquid, or as a separator of two liquid components which are immiscible and of different specific gravity and which contain solids or small amounts of a third liquid of a specific gravity higher than that of both liquid components.

As detecting liquid there may be used either one of the liquid components or a suitable liquid which does not affect any of the liquids to be processed. This liquid may not only be heavier than any one of the liquids to be processed but may also be lighter than or of the same specific gravity as such process liquids.

In said FIG. 5 feed tank 102 is filled with the process liquid to be clarified. Tank 102 may be equipped with an agitator 100 to prevent settling of the solids in the tank and clogging of feed line 14. The liquid coming from said tank 102 through feed line 14 is subjected to clarification in the centrifugal clarifying desludger 103. The clarified liquid or effluent leaves the de-sludger 103 through the discharge line 123. If the effluent is to be used as the detecting liquid, a part thereof may be recycled from discharge line 123 through branch line 108 into the detecting liquid feed line 31. In this case valve 109 is closed and valve 111 is adjusted to obtain the desired throughput of detecting liquid. The effluent is recovered through line 121.

Alternatively, an open feed tank 105 for the detecting liquid could be positioned above the separator bowl 103 to feed detecting liquid under pressure to feed line 31. This feed tank could be supplied with liquid through line 116 by opening valve 114, a liquid level control 115 preventing tank 105 from overflowing. The detecting liquid would then flow by gravity through line 107 into the feed line 31, with valves 109 and 111 being open.

If a higher pressure of detecting liquid is required than provided by the head of the raised feed tank 105, a feed pump 110 is mounted in line 107, valve 111 is closed and valve 112 is opened to adjust the pressure of the liquid before it passes through metering device 33, i.e. a flowmeter.

If water is used as detecting liquid, it may be supplied through line 125 through opened valve 113 under a suitable pressure.

The sludge collecting in the sludge space of the bowl is intermittently discharged through discharge line 120.

Essentially the same installation may be used for the separation of liquid components of different weight, for instance, an oil-water mixture placed in feed tank 102. In the latter case, the detecting liquid may be the separated oil.

The process liquids which may be used in the apparatus include any water-containing liquid which is lighter than water and any liquid mixture in which the liquids are immiscible with each other. Such liquid mixtures include water-in-oil emulsions, such as vegetable or animal fats and oils which contain traces of water, mineral oils, organic solvents which are immiscible in water or difficult to mix therewith, or in each other, for instance, chloroform in water, phenol in water, and others. The apparatus may also be used for removing solids from liquids, such as the removal of pulp from citrus fruit, removal of insoluble solids from coffee or tea extracts, and the like.

While the invention has been described in connection with certain preferred embodiments, it will be clearly understood that many modifications and variations may occur to the skilled in the art, particularly after benefiting from the present teaching, without departing from the spirit and scope of this invention as defined in the appended claims.

I claim:

1. A centrifugal separator, comprising a rotatable bowl having an axis and a periphery, conical disc means mounted concentrically about the bowl axis and having an outer edge spaced from the bowl periphery, the outer edge of the disc means and the bowl periphery defining a sludge space, a stationary feed means coaxially arranged in said bowl for feeding into the bowl a fluid containing a heavier component to be separated, an outlet arranged concentrically about said feed means and in communication with the conical disc means for receiving and discharging from the bowl the lighter component upon rotation of the bowl, fluid of a higher concentration of heavier component than the initially fed fluid accumulating in the sludge space during said rotation, normally closed sludge discharge port means in the bowl periphery for intermittently discharging the said fluid of higher concentration of heavier component from the sludge space, means for intermittently opening the sludge discharge port means, control means for actuating the means for opening the sludge discharge port means intermittently, a conduit means leading from outside the bowl into the sludge space and having an outlet in the sludge space, a supply of a detecting liquid connected to the conduit means for supplying the detecting liquid through the conduit means to the conduit means outlet, a pressure box comprising a cylindrical housing surrounding the conduit means outlet and a yieldable diaphragm covering the end of the housing and being adjacent but normally spaced from the conduit means outlet, the diaphragm being adapted upon yielding under weight of sludge thereon to approach the conduit means outlet and thereby being effective to restrict flow of the detecting liquid through the conduit means outlet and into the pressure box, the pressure box housing having a lateral outlet therethrough constituting the only way of escape of detecting liquid entering the pressure box, a metering device arranged in the conduit means for gaging the throughput of the detecting liquid, and means operatively connecting the metering device to the control means whereby the sludge discharge port means is opened upon a predetermined detecting liquid throughput gaged by the device.

2. The centrifugal separator of claim 1, wherein said conduit means outlet extends toward the bowl axis, the diaphragm being perpendicular to the conduit means outlet.

3. The centrifugal separator of claim 1, wherein said conduit means outlet extends in a direction generally parallel to the bowl axis, the diaphragm being perpendicular to the axis and to the conduit means outlet.

4. The centrifugal separator of claim 1 wherein the pressure box outlet comprises a discharge pipe extending peripherally into the sludge space, its outlet opening being at a sufficient distance from the diaphragm so as to prevent dislodging of the sludge exerting its pressure on the diaphragm by the discharged detecting liquid.

5. The centrifugal separator of claim 1, further comprising a recycling line connecting the outlet for the lighter component to said conduit means whereby a part of the lighter component discharged from the bowl constitutes the detecting liquid supply.

6. The centrifugal separator of claim 1, wherein said metering device is a flowmeter.

7. The centrifugal separator of claim 1, wherein said metering device is a pressure gage.

8. The centrifugal separator of claim 1 wherein the lateral outlet through the housing of the pressure box is oriented opposite to the direction of rotation of the bowl.

9. In a centrifugal separator having a separator bowl and having means normally sealing the peripheral portion of the bowl but openable for desludging of the bowl, conduit means for introducing a detecting liquid into the bowl, the conduit means having an outlet within the portion of the bowl subject to accumulation of sludge, an external source of detecting liquid connected to the conduit means, the conduit means and the interconnection thereof to the source of detecting liquid being free of any by-pass path, temporarily confining means surrounding the conduit means outlet and having a lateral outlet therefrom into the bowl constituting the only way of escape of detecting liquid entering the temporarily confining means from the conduit means outlet, the temporarily confining means comprising a yieldable diaphragm adjacent but normally spaced from the conduit means outlet, the spacing therefrom decreasing in accordance with the quantity of sludge deposited on the diaphragm and thereby impeding the flow of detecting liquid from the conduit means outlet, and control means interconnected to the conduit means for continuously gaging the flow of the detecting liquid and interconnected also to the sealing means and effective to open the bowl for desludging at a predetermined minimum flow of detecting liquid.

10. In a centrifugal separator having a separator bowl and having means normally sealing the peripheral portion of the bowl but openable for desludging of the bowl, conduit means for introducing a control liquid essentially continuously into the bowl, an exterior source of supply of detecting liquid connected to the conduit means, the conduit means and the connection thereof to the liquid source being unbranched to ensure that all the detecting liquid received therein from the source be introduced thereby into the bowl, and means for gaging in essentially continuous manner a physical characteristic of the detecting liquid dependent upon the impedance met by the flow thereof into the bowl, and control means responsive to the gaging means and effective to control the opening of the bowl-sealing means for desludging of the bowl.

11. In centrifugal separation of material fed into a temporarily confining region and rotated vertically therein, the steps of accumulating a sludge component of the feed material in a peripheral portion of the region and discharging the rest of the feed material to the exterior essentially continuously from elsewhere in the region, opening the peripheral portion of the region intermittently to discharge the sludge component therefrom at intervals determined by the accumulation of sludge therein, and including supplying a detecting liquid from an exterior source and introducing it into the peripheral portion of the region, sludge accumulation in the region being effective to impede the introduction of the detecting liquid thereinto, gaging in essentially continuous manner the impedance provided by the accumulated sludge to the introduction thereof and effecting the opening of the peripheral portion of the region to discharge sludge therefrom at a predetermined level of gaged impedance to the introduction of the detecting liquid.

12. The process of claim 11 wherein the detecting liquid is introduced into the peripheral portion of the temporarily confining region by way of a second temporarily confining region located therein and interconnected therewith, the boundary therebetween being in part displaceable in accordance with the amount of accumulated sludge, displacement of the boundary by accumulation of sludge adjacent thereto being effective to reduce the size of the second temporarily confining region and thereby being effective to increase the pressure and decrease the throughput of the detecting liquid supplied thereto.

References Cited by the Examiner

UNITED STATES PATENTS

| | | | |
|---|---|---|---|
| 802,473 | 10/1905 | Raasloff | 233—20 X |
| 1,232,104 | 7/1917 | Sharples | 233—14 |
| 1,921,181 | 8/1933 | Fawcett | 233—20 |
| 2,023,762 | 12/1935 | Fawcett | 233—20 |
| 2,178,547 | 11/1939 | Bjornstjerna | 233—20 |
| 2,378,778 | 6/1945 | Lindgren et al. | 233—20 |
| 2,723,799 | 11/1955 | Sharples | 233—20 |
| 2,820,589 | 1/1958 | Fitzsimmons | 233—20 |
| 2,955,754 | 10/1960 | Nyrop | 233—20 |
| 3,052,064 | 9/1962 | Kaeser | 137—63 X |
| 3,081,027 | 3/1963 | Goulson | 233—4 |
| 3,083,943 | 4/1963 | Stewart et al | 251—331 |
| 3,167,509 | 1/1965 | Steinacker | 233—20 |

FOREIGN PATENTS

| | | |
|---|---|---|
| 312,997 | 3/1930 | Great Britain. |
| 373,560 | 5/1932 | Great Britain. |
| 461,739 | 2/1937 | Great Britain. |
| 483,438 | 4/1938 | Great Britain. |

MARTIN P. SCHWADRON, *Acting Primary Examiner.*
ROBERT F. BURNETT, *Examiner.*

H. KLINKSIEK, *Assistant Examiner.*